United States Patent [19]

Heikkilä et al.

[11] Patent Number: 5,730,877
[45] Date of Patent: Mar. 24, 1998

[54] METHOD FOR FRACTIONATING A SOLUTION

[75] Inventors: Heikki Heikkilä; Jarmo Kuisma; Hannu Paananen, all of Espoo, Finland

[73] Assignee: Xyrofin Oy, Finland

[21] Appl. No.: 722,074

[22] PCT Filed: Apr. 19, 1995

[86] PCT No.: PCT/FI95/00224

§ 371 Date: Oct. 18, 1996

§ 102(e) Date: Oct. 18, 1996

[87] PCT Pub. No.: WO95/29002

PCT Pub. Date: Nov. 2, 1995

[30] Foreign Application Priority Data

Apr. 21, 1994 [FI] Finland ............................ 941866

[51] Int. Cl.$^6$ ................................. B01D 15/08
[52] U.S. Cl. .................. 210/659; 127/46.2; 162/16; 162/36; 210/198.2
[58] Field of Search ............... 127/30, 46.2, 46.3, 127/55; 162/16, 36; 210/635, 656, 659, 198.2

[56] References Cited

U.S. PATENT DOCUMENTS

| | | | |
|---|---|---|---|
| 4,631,129 | 12/1986 | Heikkila | 210/659 |
| 4,940,548 | 7/1990 | Zinnen | 210/656 |
| 5,122,275 | 6/1992 | Rasche | 210/659 |
| 5,177,008 | 1/1993 | Kampen | 435/139 |
| 5,198,120 | 3/1993 | Masuda et al. | 210/659 |
| 5,225,580 | 7/1993 | Zinnen | 554/30 |
| 5,637,225 | 6/1997 | Heikkila | 210/659 |

FOREIGN PATENT DOCUMENTS

| | | | |
|---|---|---|---|
| 76593 | 7/1984 | Finland | 210/198.2 |
| 62-235014 | 3/1989 | Japan | 210/198.2 |
| WO 90/06796 | 6/1990 | WIPO | 210/198.2 |

*Primary Examiner*—Ernest G. Therkorn
*Attorney, Agent, or Firm*—Scully, Scott, Murphy & Presser

[57] ABSTRACT

The invention relates to a method for fractionating a solution by a chromatographic simulated moving bed method in which the liquid flow is effected in a system comprising at least two sectional beds in different ionic forms. The fractions enriched with different components are recovered during a multi-step sequence including the following operations, i.e., phases: feeding phase, eluting phase, and recycling phase. The liquid present in the sectional packing material beds with its dry solids concentration profile is recycled during the recycling phase in a loop comprising one, two, or more sectional packing material beds. The method can be employed for the following examples, fractionating sulphite cooking liquor, molasses, and vinasse.

33 Claims, 4 Drawing Sheets

METHOD FOR FRACTIONATING A SOLUTION

The present invention relates to a method for fractionating a solution into two or more fractions enriched with different components. In particular, the invention relates to a method for fractionating a solution by a chromatographic simulated moving bed method in which the liquid flow is effected in a system comprising at least two chromatographic sectional packing material beds in different ionic forms, in which the dissolved substances present in the solution are separated from each other, and if the solution to be treated comprises substantial amounts of ions, the system also comprises a unit where the ion equilibrium of the solution is changed.

Fractionation of a solution comprising many dissolved substances into fractions enriched with different components is often necessary to recover the desired components as pure as necessary. The method of the invention can be employed to carry out such fractionation. A sulphite cooking liquor, for instance, can be fractionated by the method so as to give a fraction rich in monosaccharides and/or a fraction rich in lignosulphonates; furthermore, molasses or vinasse can be fractionated in this way to obtain fractions rich in a sugar, such an sucrose, and/or betaine.

The method of the invention is particularly well suitable for recovering monosaccharides from a sulphite cooking liquor, particularly for recovering xylose from a hardwood sulphite cooking liquor, in a continuously operated process by which also a fraction enriched with lignosulphonates can be recovered, if desired.

Sulphite cooking liquor in this context denotes liquor employed in sulphite cellulose cooking, liquor obtained after such cooking, or a part thereof.

It is known per se to use ion exchange resins of different ionic forms in chromatographic separation methods. Finnish Patent 59 388 describes chromatographic separation of polyols, employing columns packed with a cation exchange resin in different ionic forms (resin with a polystyrene skeleton cross-linked with divinylbenzene and activated with sulphonic acid groups). Finnish Patent 69 296 discloses a chromatographic method for the fractionation of polyols, in particular to obtain pure xylitol. Also this method employs a resin with a polystyrene skeleton cross-linked with divinylbenzene and activated with sulphonic acid groups, packed in parallel columns; in some columns, the resin is in earth alkaline form and in the other columns in $Al^{3+}$ or $Fe^{3+}$ form.

U.S. Pat. No. 4,631,129 discloses the separation of sugars and lignosulphonates from a sulphite spent liquor by a process comprising two chromatographic treatments with ion exchange resins in different ionic forms. In the first treatment, the sulphite spent liquor is introduced into a chromatographic column comprising a strong acid resin used as column packing material in metal salt form; the metal ion is preferably a metal ion of the spent liquor, usually calcium or sodium. A substantially sugarless fraction rich in lignosulphonates and a fraction rich in sugars are obtained from this column by elution. The latter fraction is subjected to a softening treatment, and its pH is adjusted to be in the range 5.5 to 6.5, whereafter it is introduced into the second chromatographic column containing resin in monovalent form, and a second fraction rich in sugars and a second fraction rich in lignosulphonates and salts are obtained therefrom by elution. It is stated in this patent that the process is capable of recovering sugars, e.g. xylose contained in hardwood sulphite spent liquor, in a very high purity and high yields. However, a drawback of the method is that the dry solids profile which has been formed in the first chromatographic treatment and in which the components are already partly separated is destroyed in the softening treatment and pH adjustment and thus cannot be utilized in the second chromatographic treatment. The method is also complicated by the steps of concentration and additional pumping to which the solution is subjected. All of these factors add to investment costs. Furthermore, this method and all prior art chromatographic separation methods in which ion exchange resins of different ionic forms are used are attended by the drawback that they are typically batch methods and are not suitable for fractionating solutions on an industrial scale.

Continuously operated chromatographic separation processes nowadays commonly employ the simulated moving bed method, which is known in modifications developed for a variety of different applications.

The simulated moving bed method enables a separating performance as high as several times that of the batch method, and also significantly lower dilution of the products (consumption of eluent).

The simulated moving bed method may be either continuous or sequential, as described in the copending Finnish patent applications 930321 and 932108 (corresponding to international patent applications WO 94/17213 and WO 94/26380, respectively). In the continuous simulated moving bed method, typically all flows are continuous. These flows are: supply of feed solution and eluent, recycling of liquid mixture, and withdrawal of products. The flow rate for these flows may be adjusted in accordance with the separation goals (yield, purity, capacity). Normally, 8 to 20 sectional packing material beds are combined into a single loop. The feed and product withdrawal points are shifted cyclically in the downstream direction in the packing material bed. On account of the supply of eluent and feed solution, the withdrawal of products, and the flow through the packing material bed, a dry solids concentration profile is formed in the packing material bed. Components having a lower migration rate in the packing bed are concentrated in the back slope of the dry solids concentration profile, and respectively components having a higher migration rate in the front slope. The points of introduction of the feed solution and eluent and the withdrawal points of the product or products are shifted gradually at substantially the same rate at which the dry solids concentration profile moves in the packing material bed.

The feed and withdrawal points are shifted cyclically by using feed and product valves located along the packing material bed typically at the upstream and downstream end of each sectional packing material bed. If it is desired to recover product fractions of very high purity, short cycle times and a plurality of sectional packing material beds must be employed (the apparatus has the requisite valves and feed and withdrawal equipment).

In the sequential simulated moving bed method, not all flows are continuous. In the sequential simulated moving bed method, the flows are: supply of feed solution and eluent, recycling of liquid mixture, and withdrawal of products (eluting phase; 2 to 4 or more products). The flow rates and the volumes of the different feeds and product fractions may be adjusted in accordance with the separation goals (yield, purity, capacity). The method comprises three basic phases: feeding, elution and recycling. During the feeding phase, a feed solution, and possibly also an eluent during a simultaneous eluting phase, is introduced into predetermined sectional packing material beds, and simultaneously a product fraction or fractions are withdrawn. During the eluting phase, eluent is introduced into a predetermined sectional packing material bed or predetermined sectional packing material beds, and during these phases two, three or even four product fractions are withdrawn. During the recycling phase, no feed solution or eluent is supplied to the sectional packing material beds and no products are withdrawn.

Sequential simulated moving bed methods are disclosed in British published application 2 240 053 and U.S. Pat. No. 4,970,002, for instance. A sequential simulated moving bed method applied to the recovery of betaine and sucrose from beet molasses is disclosed in Finnish Patent 86 416 (U.S. Pat. No. 5,127,957). Also the above-mentioned copending Finnish patent applications 930321 (filing date Jan. 26, 1993) and 932108 (filing date May 19, 1993) relate to a sequential simulated moving bed method, the first applied to the fractionation of molasses and the latter to the fractionation of sulphite cooking liquor. As is described in these applications, the simulated moving bed method may be a multistep process.

The object of the present invention is a chromatographic method for the continuous fractionation of solutions, employing ion exchange resins of two or more different ionic forms, so that the dry solids concentration profile formed upon passage of the solution through the chromatographic packing material having a first ionic form is passed to the chromatographic packing material having a second ionic form without the partially separated components being remixed, and/or that the concentration and pumping stages of the solution, included in the prior art methods for fractionating solutions with packing material of two different ionic forms, can be avoided.

By the method of the invention, valuable components of solutions produced as by-products in industry, such as monosaccharides and lignosulphonates from sulphite cooking liquor in the pulping industry and sugar, such as sucrose, and/or betaine from molasses produced in the sugar industry or vinasse produced in the fermentation industry, can be advantageously recovered. The method of the invention is particularly suitable for the recovery of xylose from a hardwood sulphite cooking liquor.

DESCRIPTION OF THE PREFERRED EMBODIMENTS

The present invention relates to a simulated moving bed method in which the liquid flow is effected in a system comprising at least two sectional packing material beds of different ionic forms. Between fractionation operations performed in packing materials of different ionic forms, the solution may be subjected to an additional treatment step. For example, if the solution contains ions, the ion equilibrium of the solution is changed to be suitable for fractionation in the packing material having another ionic form. A change in the pH is also a change in the ion equilibrium.

A preferred embodiment of the invention is a sequential simulated moving bed in which the products are recovered during a multi-step sequence.

A sectional packing material bed may comprise one column; it is nevertheless also possible to pack several successive sectional packing material beds in a single column, depending on the column structure. On the other hand, several successive columns may be connected to form one or more loops.

Changing of the ion equilibrium of the solution to be suitable for fractionation with a packing material having another ionic form may comprise removal of specific ions from the solution by ion exchange or precipitation, pH adjustment, and/or filtration, for instance. When the feed solution is sulphite cooking liquor having calcium as the base, this can be exchanged into sodium by ion exchange, or the calcium may be precipitated for example as calcium sulphite or calcium sulphate with a sodium sulphite solution or sulphuric acid. The dry solids profile can be maintained essentially intact when the precipitation is performed for example in a tube reactor. The apparatus for carrying out such treatments can be connected in series between the sectional packing material beds having different ionic forms.

The ionic form of the packing material in this context means the ion equilibrium; for instance one sectional packing material bed may be predominantly in the calcium form and partly in the magnesium and/or sodium form. The ionic form of the packing material is equilibrated according to the ionic form of the feed solution employed, and/or it is separately adjusted to suit the solution to be treated in each case.

The ionic form of the sectional packing material beds is selected in accordance with the solution to be fractionated. When the feed solution is sulphite cooking liquor, for instance, the packing material bed for the first fractionation treatment is preferably in the base form of the cooking liquor (often calcium or magnesium) and the packing material bed for the second fractionation treatment in monovalent metal ion form, e.g. $Na^+$ and/or $K^+$ form. In the fractionation of vinasse, preferably the monovalent form (e.g. $Na^+$ or $K^+$) is first used, followed by the divalent form (e.g. $Ca^{2+}$ or $Mg^{2+}$).

The method of the invention may be employed to fractionate sugar solutions as well. For example from a solution obtained from lactose by alkaline isomerization and containing lactose, lactulose and galactose, a fraction enriched with galactose can be separated with a packing material in $Na^+$ form, And fractions enriched with lactulose and lactose can be separated from one another with packing material in $Ca^{2+}$ form. Likewise, salts can be removed from molasses, or maltose can be removed from syrup, with a packing material in $K^+/Na^+$ form, and after subsequent inversion of sucrose, being carried out as an intermediate step, fractions enriched with glucose and fructose can be separated from one another with a packing material in $Ca^{2+}$ form.

In a preferred sequential simulated moving bed method of the invention, the product or products are recovered by employing a multi-step sequence comprising the following operations, i.e. phases: feeding phase of the solution to be fractionated, eluting phase and recycling phase.

During the feeding phase, the solution to be fractionated (feed solution) is supplied to the sectional packing material bed, and a corresponding amount of a product fraction is recovered at a point downstream in the flow direction, which may be either in the same sectional packing material bed as the feed point (in which case the other sectional packing material beds in the system may be in the eluting or recycling phase, for instance) or in a Sectional packing material bed different than the feed point, and connected in series (possibly through other sectional packing material beds and/or a unit changing the ion equilibrium) with the sectional packing material bed to which feed solution is supplied.

During the recycling phase, the liquid present in the sectional packing material beds with dry solids profile is recycled in a loop comprising one, two or more sectional packing material beds.

In the eluting phase, eluent is introduced into a sectional packing material bed and a corresponding amount of product fraction or fractions are recovered at a downstream point of the packing material bed, from the same or a downstream sectional packing material bed.

A process step comprises one or more of the above simultaneous identical or different phases. A step can consist of, for example, a feeding phase, recycling phase or eluting phase only, a feeding phase and a simultaneous recycling and/or eluting phase or phases, an eluting phase and a simultaneous recycling phase or phases, a recycling phase and a simultaneous eluting phase or phases, etc. These steps are repeated one or several times during the sequence.

These phases are employed to form sequences comprising several successive process steps. In accordance with the invention, a sequence comprises 4 to 20, preferably 4 to 10 steps.

A sequence comprising the above steps is repeated about 6 to 8 times to equilibrate the system, whereafter the process is continued in a state of equilibrium.

Typically 2 to 12, preferably 2 to 7, chromatographic sectional packing material beds grouped into one or more loops are employed in the method of the invention. A loop may comprise one, two or more sectional packing material beds packed in one or more columns.

In the method of the invention, recycling is employed such that one, two, three or even more discrete successive loops are formed in the recycling phase. For example, when the number of sectional packing material beds is three, these may form one loop or preferably two loops (in which case the method is called a two-phase method), one of the loops comprising one and the other two sectional packing material beds. When the system comprises several successive discrete loops, each of these may be closed or open, that is, when the liquid is recycled in one loop, eluent can be introduced into the other loop and a product fraction can be withdrawn therefrom. During the feed and elution, the flow through the packing material beds may be effected between the successive loops, the flows conveying material from one loop to another. During the recycling phase, the loop is closed and isolated from the other loops. A separate dry solids profile is recycled in each of the discrete loops. Each sectional packing material bed may form one discrete loop. On the other hand, a loop may comprise one or more sectional packing material beds.

A particularly preferred embodiment of the invention is a simulated moving bed method employing sectional packing material beds in two different ionic forms for simultaneous recovery of xylose and lignosulphonates from a hardwood sulphite cooking liquor on an industrial scale in high yields and advantageous purity for further processing or use. Furthermore, the salts, oligosaccharides and other components in the sulphite cooking liquor which are harmful to the production of pure crystalline xylose, for instance, can be advantageously removed from the xylose fraction by this method. If a softwood sulphite cooking liquor is employed as the raw material, the prevailing monosaccharide is mannose and a mannose-rich fraction is obtained by the method.

If in the method only a monosaccharide (e.g. xylose) fraction and a residue fraction are separated from the sulphite cooking liquor, the lignosulphonates are eluted with organic and inorganic salts into the residue fraction. However, the method of the invention yields a dry solids profile in which lignosulphonates are concentrated in relation to salts at the front slope of the dry solids profile, and they can be recovered by suitably selecting the product withdrawal point.

The implementation of the method (e.g. the ionic forms of the sectional packing materials; number of loops to be formed) and the process parameters are chosen for example in accordance with the composition of the feed solution employed as the raw material so as to yield an optimum result with regard to product purity and yield and the separation capacity of the packing material.

Preferably a strong acid gel-type cation exchange resin (e.g. "Finex", "Amberlite" or "Dowex") is employed as the packing material, and in the first chromatographic fractionation treatment it preferably has the ionic form of the feed solution. Prior to separation, the solids present in the solution are removed therefrom by filtration.

If the solution to be fractionated is e.g. a sulphite cooking liquor, vinasse or molasses, it is heated to 40° to 100° C., preferably 50° to 85° C., prior to being fed into the separation process. In such a case, the eluent employed can be water or a solution obtained from concentration of dilute fractions (e.g. condensate obtained from evaporative concentration) at a temperature 40° to 100° C., preferably 50° to 85° C. The linear flow rate of the liquid in the columns is 0.5 to 12 m/h, even 20 m/h, preferably 2 to 10 m/h.

The following examples illustrate the invention in greater detail. These examples are not to be construed as limiting the field of the invention, but they are only illustrative of the special embodiments of the invention.

The dry solids contents indicated have been determined by the Karl Fischer method, unless otherwise indicated.

EXAMPLE 1

Two-phase separation method for sulphite cooking liquor

A chromatographic separation apparatus comprising four columns connected in series was employed. Three of these were separation columns and one was a column removing divalent cations. The apparatus further comprised a feed pump, recycle pumps, an eluent water pump, flow and pressure regulators, and inlet and product valves for the process streams. Columns 1, 2 and 4 were separation columns and column 3 a column for removing divalent cations. The two first columns comprised four sectional packing material beds (8 m), the column for removing divalent cations comprised one sectional packing material bed (1.5 m), and the fourth column comprised two sectional packing material beds (4 m).

Each of the four columns was packed with a strong acid cation exchange resin (Finex V09 C™). The resin had a polystyrene skeleton; it was cross-linked with divinylbenzene and activated with sulphonic acid groups, and had a mean bead size (in $Na^+$ form) of 0.39 mm. The resin had a DVB content of 5.5%. The resin of the first two columns had been regenerated into $Ca^{2+}$ form and the sectional packing material of columns 3 and 4 into $Na^+$ form prior to the test.

Test conditions:

Diameter of columns 0.11 m

Height of resin bed in the column for removing divalent cations 1.5m

Total height of resin bed in separation columns 12 m

Temperature 75° C.

Volume flow rate 14–75 l/h

The feed solution was hardwood sulphite cooking liquor whose composition was analyzed by HPLC. The cooking liquor was in calcium base form. The analysis results are shown in Table 1, where the percentages of the different components are given as per cent by weight on dry solids basis.

TABLE 1

| Analysis of feed solution | |
|---|---|
| Lignosulphonates, % | 42.0 |
| Glucose, % | 1.1 |
| Xylose, % | 26.6 |
| Galactose + rhamnose, % | 2.0 |
| Arabinose, % | 0.6 |
| Mannose, % | 1.3 |
| Total monosaccharides, % | 31.6 |
| Oligosaccharides, % | 1.0 |
| Others, % | 25.4 |
| pH | 3.1 |
| Conductivity, mS/cm | 6.7 |
| Colour, ICUMSA | 84000 |
| Dry solids content, % by wt. | 49.3–53.9 |

Fractionation was performed by a four-step sequence. The sequence had a cycle length of 92 minutes, and it comprised the following steps:

Step 1: 17 l of feed solution was introduced (feeding phase) into column 1 at a volume flow rate 33 l/h, and 17 l of residue (residue 1) was eluted from the downstream end of the same column at the same volume flow rate. Simultaneously 25 l of eluent water was supplied (eluting phase) to column 2 at a volume flow rate 45 l/h, and 25 l of residue (residue 4) was withdrawn from column 4 at a volume flow rate 45 l/h. In this eluting phase, the column for removing divalent cations was connected to this open elution loop. The volume flow rate in the column for removing divalent cations during the elution was 45 l/h, and the feed volume from this column was 25 l. Subsequent to the column for removing divalent cations, the pH of the solution was adjusted to be within the range 5.5 to 6.5. After pH adjustment, the solution was filtered. The feed from the column for removing divalent cations was introduced into the upper portion of the fourth column.

Step 2: Recycling (recycling phase) in the loop formed by columns 1 and 2 (13.0 l; 50 l/h) with simultaneous supply of 4.5 l of water to column 4 (eluting phase) at a volume flow rate 35 l/h, and elution of a recycle fraction from column 4 (4.5 l; 35 l/h).

Step 3: 20 l of water was introduced into the upper portion of column 1 at a volume flow rate 75 l/h, and a residue was eluted (residue 2) from the bottom of column 2 (20 l; 75 l/h). Simultaneously 21.5 l of water was supplied to the upper portion of column 4 at a volume flow rate 35 l/h and a xylose fraction was eluted from column 4 (21.5 l; 35 l/h).

Step 4: Recycling (recycling phase) in the loop formed by columns 1 and 2 (4.8 l; 75 l/h) and in the separate loop formed by column 4 (4.2 l; 14 l/h).

After the sequence was carried to completion, the process control program was continued and it returned to the beginning, starting the sequence anew from step 1. By repeating this sequence six to eight times the system was equilibrated. The method was proceeded with in a state of equilibrium, and the progress of the separation process was monitored with a density meter, a meter for optical activity, and a conductivity meter, and the separation was controlled by a microprocessor which controlled precisely the volume flow rates and volumes of feeds, employing quantity/volume measuring devices, temperature controllers, valves and pumps.

In this method, four product fractions were fractionated: a xylose fraction from column 4, one residue fraction from column 1, one residue fraction from column 2 and one residue fraction from column 4. An analysis of the product fractions and recycle fraction obtained during one sequence in a state of equilibrium is shown in Table 2, where the percentages of the different components are given as per cent by weight on dry solids basis.

The xylose yield from this fractionation was 90.9% calculated from the product fractions.

TABLE 2

| Analysis of product fractions and recycled fraction | | | | | |
|---|---|---|---|---|---|
| | Xylose | Residue 1 | Residue 4 | Residue 2 | Recycle |
| Volume, l | 21.5 | 17.0 | 25.0 | 20.0 | 4.5 |
| Dry solids content, K-F, g/100 g | 17.62 | 9.25 | 2.84 | 20.48 | 11.29 |
| Xylose, % | 65.52 | 4.33 | 11.69 | 2.55 | 28.16 |
| Monosaccharides, % | 75.96 | 5.37 | 14.38 | 3.29 | 35.50 |
| Oligosaccharides, % | 0.68 | 0.71 | 0.39 | 0.67 | 1.32 |
| Others | 23.36 | 93.92 | 85.23 | 96.04 | 63.18 |

The calcium balance during one sequence in this fractionation in a state of equilibrium was the following:
In feed solution into column 1: 271 g
Separation from packing material in $Ca^{2+}$ form (columns 1 and 2) into product fractions:
  residue 1 60.3 g (3.7% d.s.)
  residue 2 150.3 g (3.4% d.s.)
Into column for removal of divalent cations (column 3): 60.4 g
Into packing material in $Na^+$ form (column 4): 196 mg
Separation from packing material in $Na^+$ form into product fractions:
  residue 4 100 mg
  xylose fraction 77 mg
  recycle 19 mg

EXAMPLE 2

Two-phase separation method for sulphite cooking liquor

Fractionation was performed employing the chromatographic separation apparatus described in Example 1, which comprised two loops, removal of divalent cations, and pH adjustment. The sequence carried out differed from the procedure of Example 1 in regard to step 2, in which a residue fraction and a recycle fraction were successively eluted with water from column 4. In this sequence, a fraction rich in lignosulphonates was additionally eluted. The volume parameters and volume flow rates of the feeds and recovered fractions were modified. These modifications were due to the fact that a different packing material (Relite C-360) was employed in the column for removal of divalent cations, and the sectional packing material bed in column 4 had a greater height. The resin Relite C-360™ had a polystyrene skeleton cross-linked with divinylbenzene, and it was activated with sulphonic acid groups; the bead size was 0.3 to 1.2 mm and the DVB content 16%. The sectional packing material in the other columns was the same as in Example 1. The feed solution was the same as above.

Test conditions:

Diameter of columns 0.11 m

Height of resin bed in the column for removing divalent cations 1.5 m

Total height of resin bed in separation columns 13 m

Temperature 75° C.

Volume flow rate 22–50 l/h

A lignosulphonate-rich fraction was eluted from column 2.

Fractionation was performed by a four-step sequence. The sequence had a length of 98 minutes, and it comprised the following steps:

Step 1: 20 l of feed solution was introduced (feeding phase) into column 1 at a volume flow rate 22 l/h, and a 20 l residue fraction (residue 1) was eluted from the downstream end of the same column. Simultaneously 33 l of water was supplied (eluting phase) to column 2 at a volume flow rate 40 l/h and a residue fraction (residue 4/1, 33 l; 40 l/h) was eluted from column 4.

Step 2: Recycling (recycling phase) in the loop formed by columns 1 and 2 (11 l; 35 l/h). Simultaneously 8 l of water was supplied to column 4, and 4 l of residue fraction (residue 4/2) was first eluted from column 4 at a volume flow rate of 35 l/h and thereafter 4 l of recycle fraction was eluted from column 4 at the same volume flow rate.

Step 3: 16 l of water was introduced into the upper portion of column 1 at a volume flow rate 45 l/h, and a lignosulphonate-rich fraction was eluted from the bottom of column 2 (16 l; 45 l/h). Simultaneously 22 l of water was supplied to the upper portion of column 4 at a volume flow rate 40 l/h, and a xylose fraction was eluted from column 4 (22 l; 40 l/h).

Step 4: Similar to step 4 in Example 1 (recycling in the loop formed by columns 1 and 2 4.8 l, 75 l/h; in the loop formed by column 4 0 l; 0 l/h).

This sequence was repeated six to eight times, whereafter the system was equilibrated, and the method was proceeded with in a state of equilibrium until the column for the removal of divalent cations required regeneration.

An analysis of the product fractions and recycle fraction obtained in this fractionation during one sequence in a state of equilibrium is shown in Table 3. The percentages of the components are calculated as per cent by weight on dry solids basis.

The xylose yield from this fractionation was 94.7%.

Figure 1:
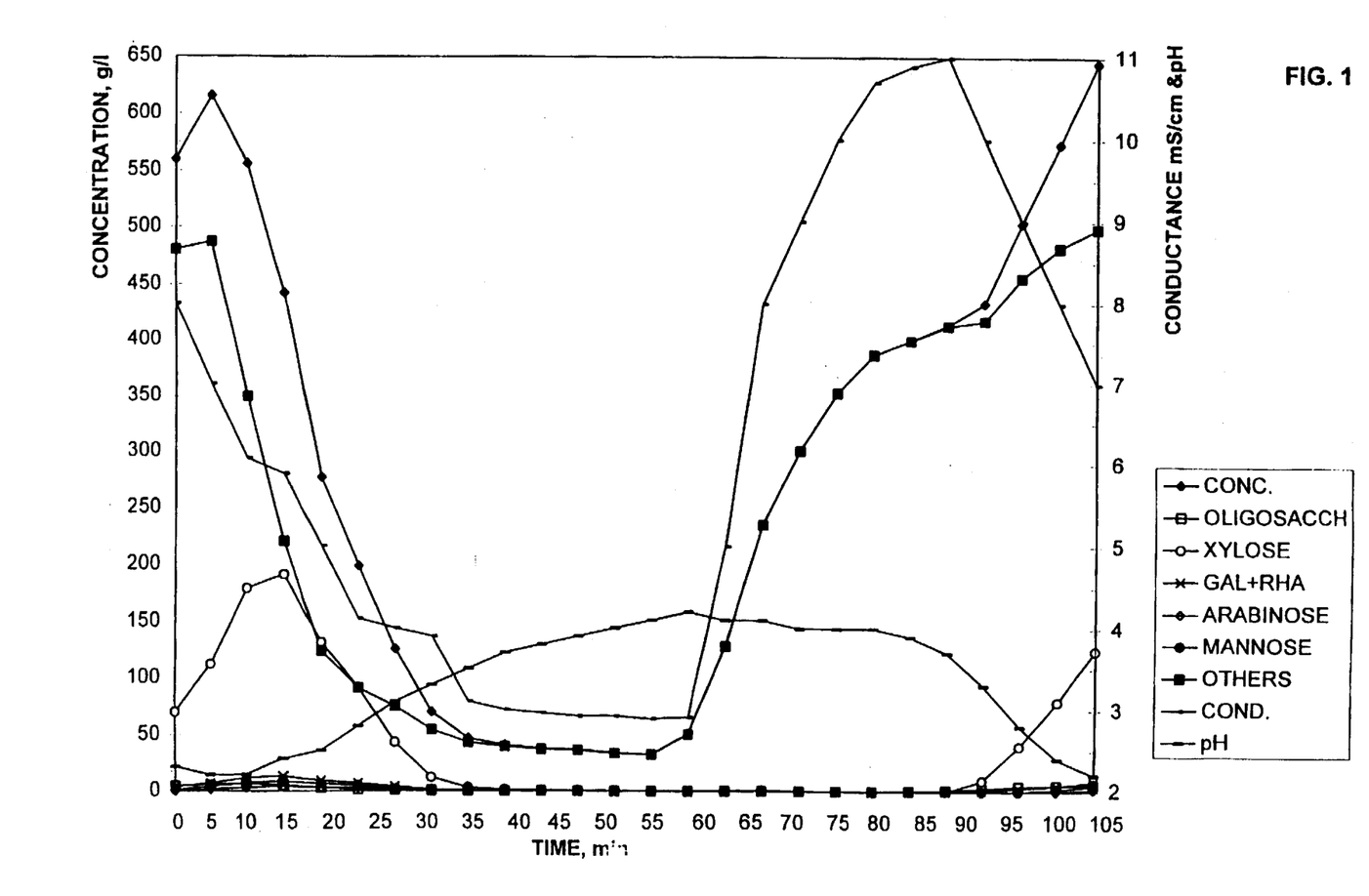
FIG. 1 shows the separation curves of column 1.
Figure 2:
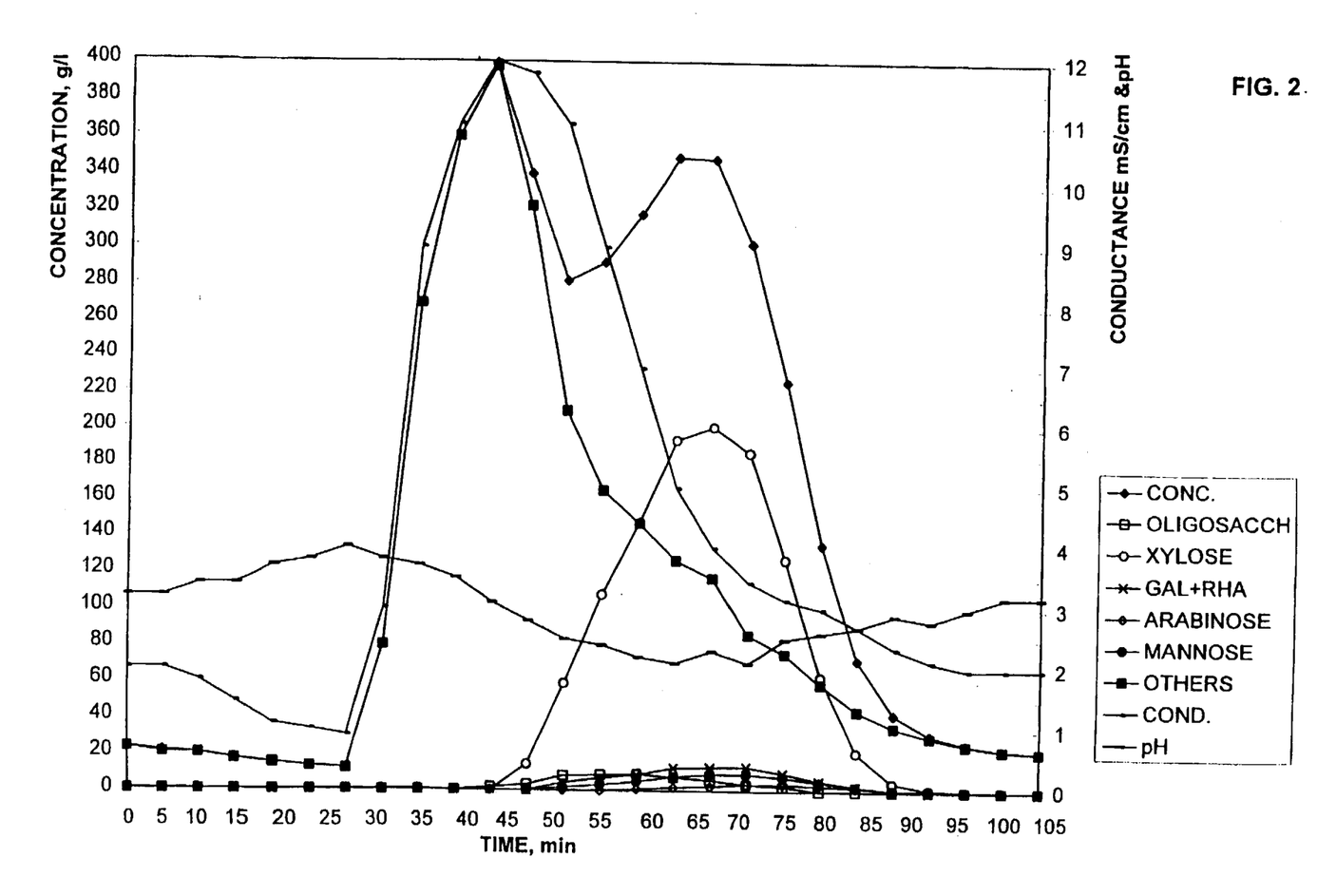
FIG. 2 shows the separation curves of column 2.
Figure 3:
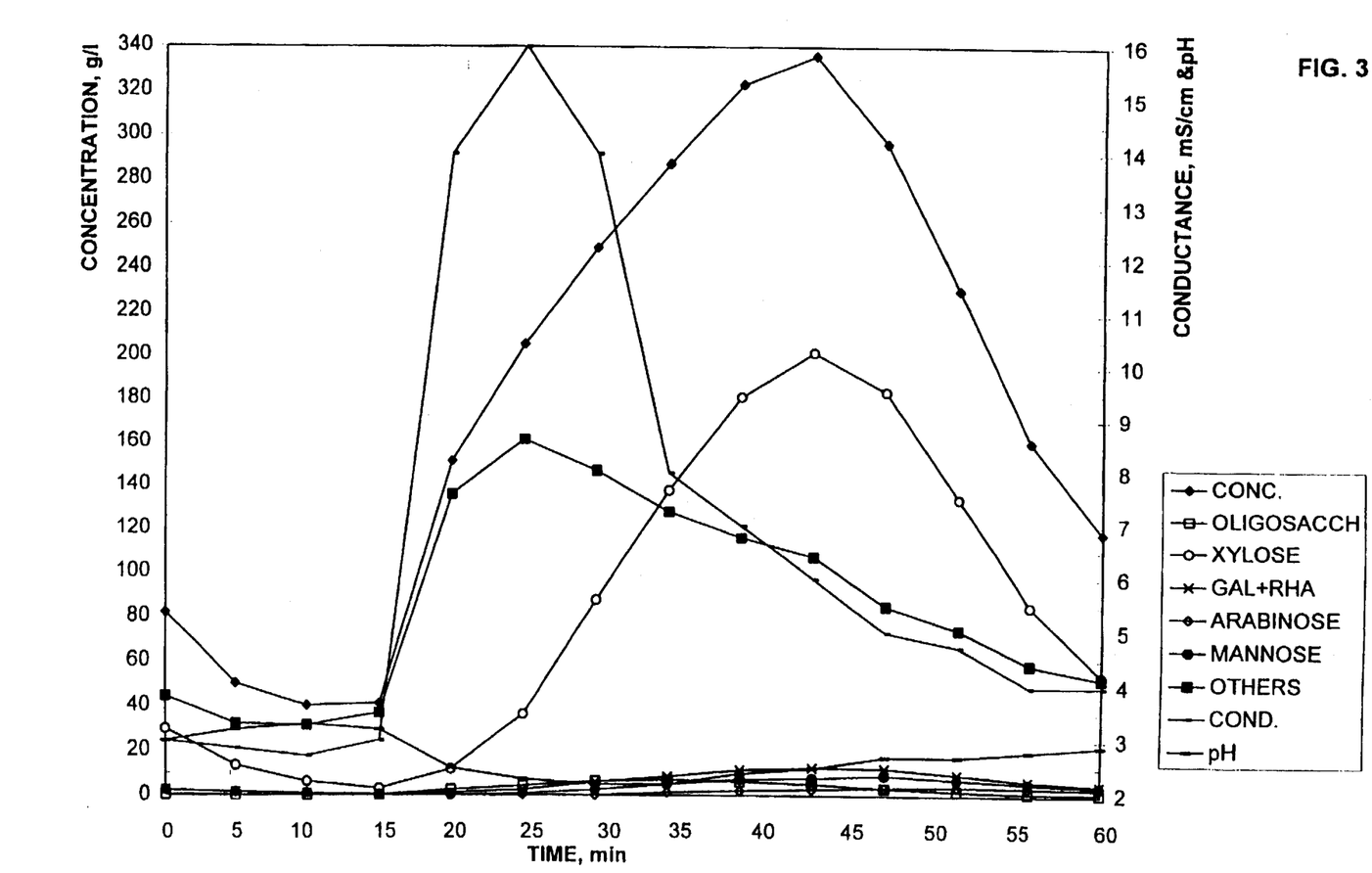
FIG. 3 shows the separation curves of column 3 for the removal of divalent cations.
Figure 4:
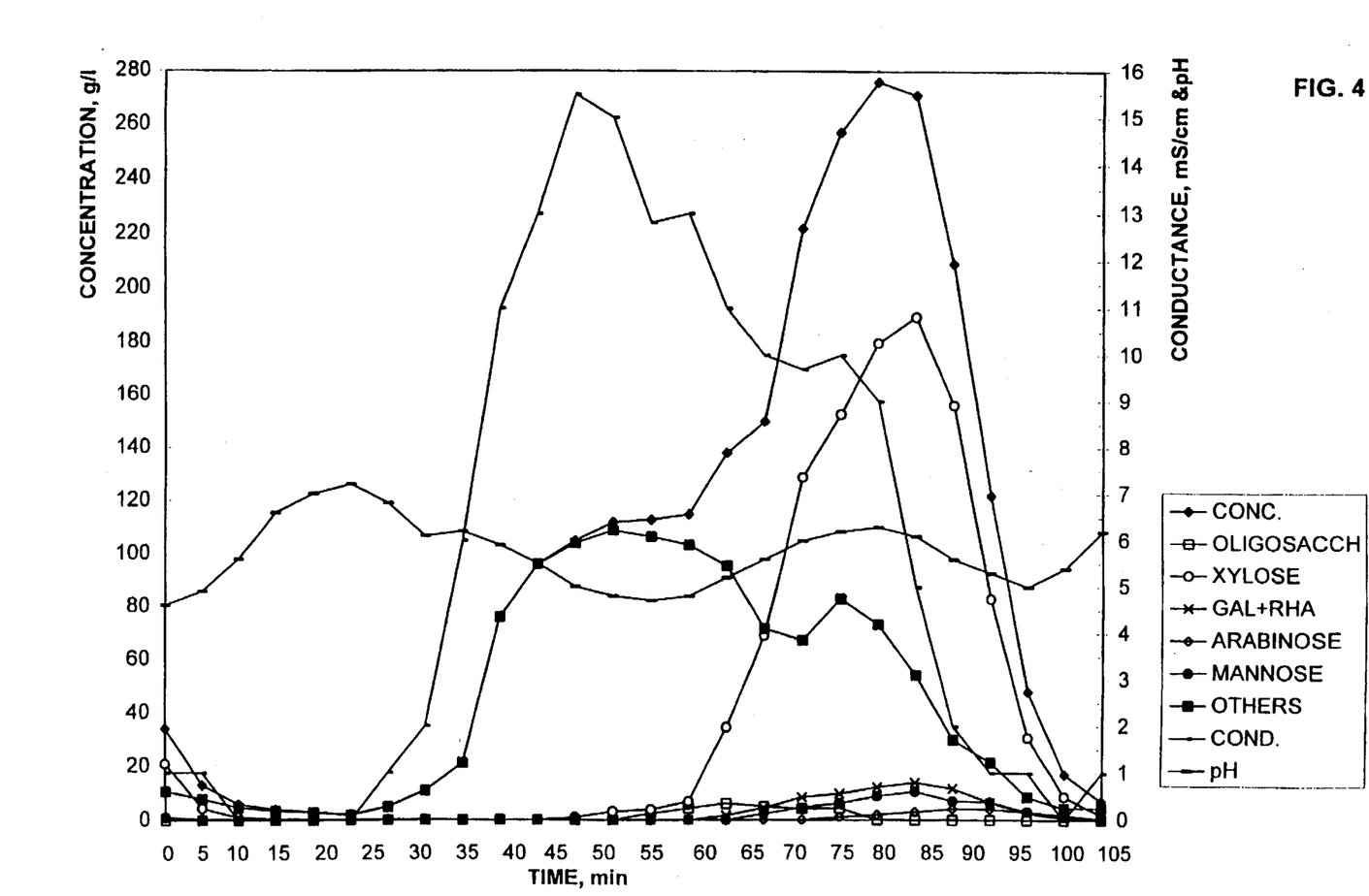
FIG. 4 shows the separation curves of column 4.

FIG. 1 shows the separation curves of column 1, FIG. 2 the separation curves of column 2, FIG. 3 the separation curves of column 3 for the removal of divalent cations, and FIG. 4 the separation curves of column 4 for this fractionation.

The lignosulphonate content has been determined by means of UV absorbance measurement (absorptivity 14.25 l·g$^{-1}$·cm$^{-1}$).

EXAMPLE 3

Two-phase separation method for sulphite cooking liquor

Fractionation was performed with a chromatographic separation apparatus comprising four columns. The first loop comprised columns 1 and 2 (packing material in Ca$^{2+}$ form), column 3 was a column for the removal of divalent cations in the solution, and a pH adjustment unit was connected between column 3 and column 4. Column 4 constituted the latter loop, and its packing material was in the Na$^+$ form. The feed solution and the sectional packing material for the columns were the same as in Example 2.

Test conditions:

Diameter of columns 0.11 m

Height of resin bed in the column for removing divalent cations 1.5 m

Total height of resin bed in separation columns 13 m

Temperature 75° C.

Volume flow rate 22–50 l/h

Fractionation was performed by a five-step sequence. The sequence had a length of 100 minutes, and it comprised the following steps:

Step 1: 20 l of feed solution was introduced (feeding phase) into column 1 at a volume flow rate 22 l/h, and a 20 l residue fraction (residue 1) was eluted from the downstream end of the same column. Simultaneously 34 l of water was supplied (eluting phase) to column 2 at a volume flow rate 40 l/h, and a residue (residue 4) was eluted from column 4 (34 l; 40 l/h).

Step 2: Recycling (recycling phase) in the loop formed by columns 1 and 2 (11 l; 35 l/h). Simultaneous recycling (recycling phase) of 3 l at a volume flow rate 40 l/h in the loop formed by column 4.

Step 3: 16 l of water was introduced into column 1 at a volume flow rate 45 l/h, and a residue was eluted from column 2 (residue 2, 16 l; 45 l/h). At the same time, 4 l of water was supplied to column 4 at a volume flow rate 40 l/h, simultaneously eluting a recycle fraction from the bottom of column 4 (4 l; 40 l/h).

Step 4: Recycling (recycling phase) in the loop formed by columns 1 and 2 (3.5 l; 50 l/h). 18 l of water was supplied to column 4 at a volume flow rate 40 l/h, and 18 l of xylose fraction was eluted from column 4 at a volume flow rate 40 l/h.

Step 5: Further recycling (recycling phase continued) in the loop formed by columns 1 and 2 (3.5 l; 50 l/h). Simultaneous recycling (recycling phase) in the loop formed by column 4 (4 l; 30 l/h). During this step, the two recycling phases were synchronized to end at the same time.

TABLE 3

Analysis of product fractions

|  | Xylose | Residue 1 | Residue 4/1 + recycle | Residue 4/2 | Lignosulphonate fraction |
|---|---|---|---|---|---|
| Volume, l | 22.0 | 20.0 | 37.0 | 4.0 | 16 |
| Dry solids content, K-F, g/100 g | 16.44 | 10.07 | 4.87 | 10.61 | 20.40 |
| Xylose, % | 70.83 | 0.64 | 7.07 | 24.01 | 0.29 |
| Monosaccharides, % | 81.86 | 0.89 | 8.65 | 26.57 | 0.29 |
| Oligosaccharides, % | 1.51 | 0.00 | 1.29 | 5.37 | 0.00 |
| Lignosulphonates, % | 5.02 | 57.70 | 25.60 | 16.56 | 65.00 |
| Others | 11.61 | 41.41 | 64.46 | 49.50 | 34.71 |

This sequence was repeated six to eight times, whereafter the system was equilibrated, and the method was proceeded with in a state of equilibrium until the column for the removal of divalent cations required regeneration.

An analysis of the product fractions and recycle fraction obtained in this fractionation during one sequence in a state of equilibrium is shown in Table 4. The percentages of the components are calculated as percent by weight on dry solids basis.

The xylose yield from this fractionation was 92.7%.

TABLE 4

Analysis of product fractions and recycled fraction

|  | Xylose | Residue 1 | Residue 4 | Residue 2 | Recycle |
|---|---|---|---|---|---|
| Volume, l | 18.0 | 20.0 | 34.0 | 16.00 | 4.0 |
| Dry solids content, K-F, g/100 g | 19.25 | 10.51 | 5.71 | 19.94 | 14.08 |
| Xylose, % | 71.08 | 2.61 | 6.91 | 0.48 | 48.36 |
| Monosaccharides, % | 83.16 | 2.87 | 9.42 | 0.48 | 62.02 |
| Oligosaccharides, % | 0.92 | 0.43 | 0.90 | 0.36 | 3.18 |
| Others | 15.92 | 96.70 | 89.68 | 99.16 | 34.80 |

The fractionation described above was performed also in a variant where the divalent ions were removed, instead of ion exchange, by precipitating the calcium in a tube reactor, as described hereinbelow.

A. Precipitation of calcium as calcium sulphite

The pH of the solution obtained from column 2 and introduced into column 3 was adjusted with sodium hydroxide to about 7 at about 60° C. A quantity of an aqueous solution of sodium sulphite (about 1 M) was added such that the amount of added sulphite ions was about 1.3 times the molar amount of calcium to be precipitated. Kenite 300 diatomaceous earth was employed as an aid in the filtration. Thus it was possible to remove about 90% of the calcium present in the solution. Xylose losses in the calcium removal thus performed were negligible.

B. Precipitation of calcium as calcium sulphate

The procedure was similar to that of variant A above, but the precipitation was carried out by adding an amount of sulphuric acid in which the number of sulphate equivalents was about 1.5 times that of calcium equivalents, and the pH of the solution was adjusted to be in the range 5.5 to 6 with sodium hydroxide. In this way, it was possible to remove about 70% of the calcium.

EXAMPLE 4

Three-stage separation method for vinasse

A pilot plant scale chromatographic test apparatus was used. The apparatus comprised three chromatographic separation columns connected in series, a pH adjustment unit, a filtration unit, a feed pump, recycling pumps, an eluent water pump, flow and pressure regulators, and inlet and product valves for the process streams. Each of the three columns was packed with a strong acid cation exchanged resin (Finex C13 S™). The resin had a polystyrene skeleton, it was cross-linked with divinylbenzene and activated with sulphonic acid groups and had a mean bead size (in $Na^+$ form) of 0.36mm. The resin had a DVB content of 8%. The packing material of columns 1 and 2 was in $K^+$ form and column 3 was in $Ca^{2+}$ form. The pH adjustment unit and filtration unit were connected between columns 2 and 3. The pH was adjusted with $Ca(OH)_2$. The total height of the packing material beds in the two first columns was 10 m, and the height of the packing material bed in the third column was 5 m.

The feed solution was vinasse whose composition is shown in Table 5. The percentages of the different components are given as per cent by weight on dry solids basis.

TABLE 5

Analysis of feed solution

| Inositol, % | 0.4 |
|---|---|
| Glycerol, % | 6.3 |
| Betaine, % | 13.8 |
| Trisaccharides, % | 0.4 |
| Disaccharides, % | 1.6 |
| Monosaccharides, % | 7.9 |
| Others, % | 69.6 |

Water was used as eluent.

Fractionation was performed by an eight-step sequence. The sequence had a cycle length of 93 minutes, and it comprised the following steps:

Step 1: 7 l of feed solution was introduced (feeding phase) into column 1 at a volume flow rate 90 l/h, and a fraction enriched with betaine (7 l; 90 l/h) was eluted from column 2. Simultaneous recycling (recycling phase) in the loop formed by column 3 (6 l; 75 l/h).

Step 2: Feed was continued (feeding phase) into column 1 (5 l; 90 l/h), and a residue was eluted from the bottom of the same column (5 l; 90 l/h). Simultaneously eluent was supplied (eluting phase) to column 2 (6 l; 120 l/h), and a fraction enriched with betaine was eluted from the bottom of this column (6 l; 120 l/h). The recycling phase was continued in the loop formed by column 3 (recycling 4 l; 75 l/h).

Step 3: Feed was continued into column 1 (28 l; 90 l/h), and 28 l of residue was eluted from the bottom of the same column at the same volume flow rate. Columns 2 and 3, together with the pH adjustment and precipitation unit connected between them, formed an open elution loop; 40 l of eluent was supplied to column 2 at a volume flow rate 130 l/h, and a fraction enriched with betaine was withdrawn from column 3 (40 l; 130 l/h).

Step 4: Recycling in the loop formed by columns 1 and 2 (55 l; 120 l/h) and simultaneously in the loop formed by column 3 (12 l; 75 l/h).

Step 5: 35 l of eluent was introduced into column 1 at a volume flow rate 120 l/h, and 35 l of residue was eluted from column 2 at the same volume flow rate. Simultaneously 36 l of eluent was supplied (75 l/h) to column 3 and 36 l of residue was eluted from the bottom of the same column at the same volume flow rate.

Step 6: Recycling in the loop formed by columns 1 and 2 (48 l; 130 l/h). Simultaneously 9 l of eluent was supplied to column 3 at a volume flow rate 75 l/h, and 9 l of a fraction enriched with inositol was eluted from the bottom of column 3 (75 l/h).

Step 7: Recycling was continued in the loop formed by columns 1 and 2. Simultaneously 28 l of eluent was supplied to column 3 at a volume flow rate 75 l/h and 28 l of a fraction enriched with glycerol was eluted from the bottom of column 3 (75 l/h).

Step 8: Recycling was continued in the loop formed by columns 1 and 2. Simultaneous recycling in the loop formed by column 3 (8 l; 75 l/h).

This sequence was repeated six to eight times, whereafter the system was equilibrated, and the method was proceeded with in a state of equilibrium.

The following product fractions were fractionated in this method: betaine fractions from columns 2 and 3, an inositol fraction from column 3, a glycerol fraction from column 3, two residue fractions from column 1, one residue fraction from column 2 and one residue fraction from column 3. An analysis of the product fractions (with residue fractions combined) obtained in a state of equilibrium during one sequence is shown in Table 6, where the percentages of the components are given as per cent by weight on dry solids basis.

TABLE 6

|  | Residue fractions | Inositol fraction | Glycerol fraction | Betaine fraction |
|---|---|---|---|---|
| Inositol, % | 0.1 | 12.5 | 1.6 | — |
| Glycerol, % | 0.3 | — | 75.9 | 0.1 |
| Betaine, % | 2.8 | 0.2 | 0.1 | 77.6 |
| Others, % | 96.8 | 87.3 | 22.4 | 22.3 |

EXAMPLE 5

Two-phase concentration of lactulose

A two-loop apparatus comprising five chromatographic separation columns was used to separate a solution prepared from lactose as follows: The lactose was isomerized by the conventional method with alkali into a lactulose-containing syrup. The resulting syrup was purified in the conventional manner by ion exchange employing ion exchange resins. The lactulose content of the resulting syrup was 22% on dry solids basis.

Lactose was crystallized from the ion-exchanged syrup twice, so that the lactulose content of the mother solution obtained was 50% on dry solids basis and the contents of lactose and other components (e.g. galactose) 30% and 20%, respectively.

The columns were packed with the same ion exchange resin as in Example 1. The packing material of the three first columns was in $Ca^{2+}$ form and the packing material of the two last two columns in $Na^+$ form.

Fractions enriched with lactose and other components (e.g. galactose) were withdrawn from all three columns having a packing material in $Ca^{2+}$ form. The first fraction to be recovered was the lactose fraction, and the last fraction was the fraction enriched with other components (galactose). The lactulose-containing concentrate with average retention was introduced into the packing material having $Na^+$ form.

A lactose fraction was withdrawn from both columns having a packing material in $Na^+$ form, and a fraction enriched with other components (galactose) was withdrawn from the last column (fifth column in the system).

The lactulose fraction obtained had a lactulose content of 85% on dry solids basis and a lactose content of 10% on dry solids basis. The combined lactose fractions contained 15% of lactulose on dry solids basis and 74.7% of lactose on dry solids basis. The lactulose and lactose contents of the combined by-product fraction (which comprised mainly galactose) were 22% and 18.8% on dry solids basis, respectively.

EXAMPLE 6

Two-phase separation of maltose, glucose and fructose

A two-loop apparatus comprising five chromatographic separation columns was used to separate a synthetic maltose-containing syrup containing also glucose and fructose. The solution contained 20% of maltose, 40% of glucose and 40% of fructose, all calculated on dry solids basis.

The columns were packed with the same ion exchange resin as in Example 1. The packing material of the first column was in $Na^+$ form and the packing material of the next four columns in $Ca^{2+}$ form. A maltose fraction was withdrawn from the first column, and a glucose-fructose-containing concentrate was introduced into the packing material having $Ca^{2+}$ form.

A glucose fraction and a fructose fraction were withdrawn from the third and fifth column having a packing material in $Ca^{2+}$ form (the fructose fraction was eluted more slowly).

The withdrawn maltose fraction contained 90% of maltose on dry solids basis and 10% of glucose on dry solids basis.

The combined glucose fractions contained 3% of maltose and 95% of glucose, and the combined fructose fractions contained 1% of maltose and 99% of fructose (all on dry solids basis).

EXAMPLE 7

Two-phase separation of cane molasses

Cane molasses was softened and clarified in the conventional manner by phosphatization treatment and by removing the resulting solids by centrifugation. After the centrifugation, the solution was subjected to filtration with diatomaceous earth as an aid.

A two-loop apparatus comprising seven columns was used to separate cane molasses thus pretreated, which contained 30% of non-sugars, 40% of sucrose, 15% of glucose and 15% of fructose.

The packing material of the first three columns was in $Na^+$, $K^+$ form (in equilibrium with cations in the molasses), and the packing material of the other four columns of the apparatus was in $Ca^{2+}$ form.

A non-sugar fraction was withdrawn from all three columns and a sucrose fraction with average retention was withdrawn from the third column, having a packing material in $Na^+$, $K^+$ form. The glucose-fructose-containing concentrate which was the slowest to elute was introduced into the packing material having $Ca^{2+}$ form.

A glucose fraction and a fructose fraction were withdrawn from the fifth and seventh column having a packing material in $Ca^{2+}$ form.

The combined non-sugar fractions withdrawn contained 85% of non-sugars and 15% of sucrose; the sucrose fraction obtained contained 10% of non-sugars and 85% of sucrose (all on dry solids basis). The glucose fractions obtained contained 96% of glucose and 2% of fructose on dry solids basis; the fructose fractions contained 95.6% of fructose and 2% of glucose.

We claim:

1. A method for fractionating a solution by a chromatographic separation method in which the liquid flow is effected in a system comprising at least two chromatographic sectional packing material beds, characterized in that the system comprises at least two sectional packing material beds in different ionic forms, and the fractionation is performed by the simulated moving bed method, and the solution is passed from a sectional packing material bed to the next sectional packing material bed having a different ionic form in such a way that the dry solids concentration profile present in the solution remains substantially intact.

2. A method as claimed in claim 1, characterized in that fractions enriched with different components are recovered during a multi-step sequence comprising feeding phase, an eluting phase and a recycling phase, wherein the liquid present in the sectional packing material beds with its dry solids concentration profile is recycled during the recycling phase in a loop comprising one, two or more sectional packing material beds.

3. A method as claimed in claim 2, characterized in that the sectional packing material beds in the system form two or more separate loops each comprising one or more sectional packing material beds, all of the sectional packing material beds in one loop having the same ionic form and the sectional packing material beds of at least two loops having different ionic forms.

4. A method as claimed in any one of claims 1 to 3, characterized in that the system comprises a unit in which the ion equilibrium of the solution is changed and which can be connected between sectional packing material beds having different ionic forms.

5. A method as claimed in claim 4, characterized in that the ion equilibrium is changed with an ion exchange material.

6. A method as claimed in claim 4, characterized in that the ion equilibrium is changed by precipitation.

7. A method as claimed in claim 4, characterized in that the change of the ion equilibrium comprises pH adjustment.

8. A method as claimed in claims 2, characterized in that a step comprises one or more recycling phases and/or eluting phase and recovery of a product fraction.

9. A method as claimed in claim 2, characterized in that a step comprises two or more recycling phases.

10. A method as claimed in claim 2, characterized in that a step comprises a feeding phase and/or one or more eluting phases and recovery of a product fraction or fractions.

11. A method as claimed in claim 1, characterized in that the solution to be fractionated is a sulphite cooking liquor.

12. A method as claimed in claim 11, characterized in that the sulphite cooking liquor is a hardwood sulphite cooking liquor, a cooking liquor obtained after such cooking, or a part thereof.

13. A method as claimed in claim 12, characterized in that the product fractions are a xylose fraction and/or a lignosulphonate-rich fraction and/or a residue fraction.

14. A method as claimed in claim 11, characterized in that oligosaccharides are substantially separated into the residue fractions.

15. A method as claimed in claim 11, characterized in that the sectional packing material beds in the first loop in a process step are essentially in divalent cation form and the sectional packing material beds in the last loop are essentially in monovalent cation form.

16. A method as claimed in claim 15, characterized in that the divalent cation is $Ca^{2+}$ and the monovalent cation $Na^+$.

17. A method as claimed in claim 2, characterized in that a sequence comprises 4 to 10 steps.

18. A method as claimed in claim 17, characterized in that a sequence comprising the above steps is repeated six to eight times to equilibrate the system, and the process is continued in the obtained state of equilibrium.

19. A method as claimed in claim 1, characterized in that the solution to be fractionated is vinasse.

20. A method as claimed in claim 19, characterized in that the product fractions are a sugar fraction and/or betaine fraction and/or inositol fraction and/or glycerol fraction and/or residue fraction.

21. A method as claimed in claim 19 or 20, characterized in that the sectional packing material beds in the first loop in a process step are essentially in monovalent cation form and the sectional packing material beds in the last loop are essentially in divalent cation form.

22. A method as claimed in claim 21, characterized in that the monovalent cation is $K^+$ and the divalent cation $Ca^{2+}$.

23. A method as claimed in claim 1, characterized in that a system comprising 2 to 12 chromatographic sectional packing material beds is employed.

24. A method as claimed in claim 1, characterized in that a sectional packing material bed comprises one column.

25. A method as claimed in claim 1, characterized in that a column comprises two or more sectional packing material beds.

26. A method as claimed in claim 1, characterized in that the packing material forming a sectional packing material bed is a strong acid cation exchange resin.

27. A method as claimed in claim 1, characterized in that the temperature of the feed solution and eluent water is 40° to 100° C.

28. A method as claimed in claim 1, characterized in that the feed solution has a dry solids content of 35 to 65% by weight.

29. A method as claimed in claim 1, characterized in that the linear flow rate of the liquid is 0.5 to 20 m/h.

30. A method as claimed in claim 1, characterized in that the solution is passed through a filtration unit prior to being passed from a sectional packing material bed to the next sectional packing material bed having a different ionic form.

31. A method as claimed in claim 1, characterized in that the temperature of the feed solution and eluent water is 50° to 85° C.

32. A method as claimed in claim 1, characterized in that the linear flow rate of the liquid is 2 to 10 m/h.

33. A method as claimed in claim 1, characterized in that a system comprising 3 to 6 chromatographic sectional packing material beds is employed.

* * * * *

UNITED STATES PATENT AND TRADEMARK OFFICE
CERTIFICATE OF CORRECTION

PATENT NO. : 5,730,877
DATED : March 24, 1998
INVENTOR(S) : Heikki Heikkila, et al.

It is certified that error appears in the above-identified patent and that said Letters Patent is hereby corrected as shown below:

Column 4, line 62: "Sectional" should read --sectional--

Column 9, Table 3: "26.57" should read --28.57--

Column 15, line 24, Claim 8: "in claims 2," should read --in claim 2,--

Column 15, line 27, Claim 9: "claim 2," should read --claim 3,--

Signed and Sealed this

Thirtieth Day of November, 1999

Attest:

Attesting Officer

Q. TODD DICKINSON

Acting Commissioner of Patents and Trademarks